United States Patent [19]

McIntyre et al.

[11] 4,272,625

[45] Jun. 9, 1981

[54] THERMOTROPIC POLYESTER AMIDES

[75] Inventors: James E. McIntyre, Harrogate; Alexander H. Milburn, Leeds, both of England

[73] Assignee: Imperial Chemical Industries Limited, London, England

[21] Appl. No.: 59,449

[22] Filed: Jul. 20, 1979

[30] Foreign Application Priority Data

Jul. 24, 1978 [GB] United Kingdom ............... 30879/78
Jul. 24, 1978 [GB] United Kingdom ............... 30880/78

[51] Int. Cl.³ .............................................. C08L 77/12
[52] U.S. Cl. .................................................. 528/183
[58] Field of Search ......................................... 528/183

[56] References Cited

U.S. PATENT DOCUMENTS

| | | | |
|---|---|---|---|
| 2,304,729 | 12/1942 | Bruson .............................. | 528/183 X |
| 3,575,928 | 4/1971 | Lenz et al. ........................ | 528/183 X |
| 3,859,251 | 1/1975 | Kuhfuss et al. ................... | 528/183 |
| 4,153,779 | 5/1979 | Jackson et al. .................... | 528/176 |

FOREIGN PATENT DOCUMENTS 2721787 11/1977 Fed. Rep. of Germany .
1126824  9/1968 United Kingdom .
1252303 11/1971 United Kingdom .

OTHER PUBLICATIONS

Chem. Abstracts, vol. 60, 1964, 3108g, Panaiotov.
J. of Polymer Science, Part A-1, vol. 8, No. 11, pp. 3135–3144 (1970), Preston.

Primary Examiner—Howard E. Schain
Attorney, Agent, or Firm—Cushman, Darby & Cushman

[57] ABSTRACT

Melt processable fibre-forming polyesteramides comprising residues of one or more aminophenols selected from p-aminophenol and p-N-methylaminophenol and residues of one or more dicarboxylic acids characterized in that the polyesteramide contains a balance of linear difunctional residues and dissymmetric difunctional residues derived from either the aminophenols or the acids chosen to give a product which melts below its decomposition temperature and exhibits optical anisotropy in the melt.

12 Claims, No Drawings

THERMOTROPIC POLYESTER AMIDES

This invention concerns polymers which melt substantially without decomposition to form anisotropic liquid crystal structures. Such polymers are called thermotropic polymers.

Wholly aromatic polyesters and polyamides have been known for many years but in general have proved to be very difficult to fabricate into shaped articles from a melt of the polymer because they either have extremely high melting points or decompose before reaching a melting point. More recently, as disclosed for example in a paper by McFarlane, Nicely and Davis entitled "Liquid Crystal Polymers II, Preparation and Properties of Polyesters Exhibiting Liquid Crystalline Melts" published in "Contemporary Topics in Polymer Science", Volume 2, pages 109 to 141, 1977 Plenum Press, N.Y., it has been appreciated that highly aromatic polyesters can be produced by introducing sufficient chain flexibility or moiety dissymmetry to allow the polymer to melt at or below 300° C. whilst exhibiting thermotropic behaviour. Thermotropic polyesters are also disclosed in British patent specification No. 1,507,207. This discloses thermotropic polyesters preferably comprising residues of aromatic dihydric phenols and dicarboxylic acids in which some of the rings are substituted with chloro, bromo, fluoro and methyl groups.

Also known are polyazomethines containing repeat units derived from para oriented aromatic diamines and para oriented aromatic diketones, dialdehydes, or substituted dialdehydes, or from aromatic para oriented amino-aldehydes.

Previously known para oriented highly aromatic polymers containing amide groups melt at very high temperatures with some decomposition or decompose before melting and for this reason could only be fabricated from solutions of the amide polymer.

It has now been found possible to produce polyesteramides which exhibit optical anisotropy in the melt and can be readily melt processed without substantial thermal decomposition.

According to the invention there are provided thermotropic melt processable fibre-forming polyesteramides comprising residues of one or more aminophenols selected from p-aminophenol and p-N-methylaminophenol and residues of one or more dicarboxylic acids characterised in that the polyesteramide contains a balance of linear difunctional residues and dissymmetric difunctional residues derived from either the aminophenols or the acids chosen to give a product which melts below its decomposition temperature and exhibits optical anisotropy in the melt.

By "linear difunctional residues" are meant residues of constituents which contain one or more aromatic rings that form part of the main chain of the polyesteramide each aromatic ring being connected to the other residues in the main chain by coaxial or parallel and oppositely directed bonds.

By "dissymmetric difunctional residues" are meant residues of constituents that contain one or more aromatic rings that form part of the main chain of the polyesteramide each aromatic ring being connected to other residues in the main chain by two valency bonds the aromatic rings being further characterised by at least one of the following criteria:

1. the two valency bonds are not coaxial nor parallel and oppositely directed,
2. the aromatic rings contain one or more further unreactive monovalent substituents, and
3. the aromatic ring or rings are p-phenylene groups connected to other residues in the main chain through two valency bonds to two chemically different atoms.

The linear difunctional residues contribute the anisotropic melt-forming property of the polyesteramide and the dissymmetric difunctional residues contribute the ability of the polyesteramide to melt below its decomposition temperature.

In polyesteramides according to the invention a given aminophenol or dicarboxylic acid may give a residue which can be classified under either heading. Thus, both aminophenols can perform the function of the linear residues in that they contribute to the ability to form an ordered melt and can also contribute to a lower of the melting point. Thus, p-aminophenol can contribute to lowering the melting point although being essentially a linear residue because in a polymer chain successive ends of the chain derived from p-aminophenol may be disposed with like groups nearest each other (head-to-head or tail-to-tail) or with unlike groups nearest to each other (head-to-tail). The p-N-methylaminophenol is particularly effective in reducing the melting point because the additional methyl group as compared to p-aminophenol makes it less able to associate by hydrogen bonding with an aminophenol residue in an adjacent polymer chain.

Dicarboxylic acids which can contribute to both functions include substituted terephthalic acids, 1,2-bis(p-carboxyphenoxy)ethane, and 4-carboxyphenoxyacetic acid. Typical of the linear residues are terephthalic acid, substituted terephthalic acids, naphthalene-2,6-dicarboxylic acid, 1,2-bis(p-carboxyphenoxy)ethane, 4-carboxyphenoxyacetic acid, p-aminophenol and p-N-methylaminophenol. Typical of the dissymmetric residues are isophthalic acid, naphthalene-1,6-dicarboxylic acid, substituted terephthalic acids, 1,2-bis(p-carboxyphenoxy)ethane, 4-carboxyphenoxyacetic acid, p-aminophenol and p-N-methylaminophenol.

Even with the knowledge available from the prior art relating to thermotropic polyesters it was not possible to predict that thermotropic polyesteramides could be prepared, still less the combinations of linear and dissymmetric residues which would be required. For example, from the prior disclosure of British patent specification No. 1,507,207 it would be reasonable to predict that the most effective constituent for polymerising with the aminophenols would be a halogenated, preferably chlorinated, derivative of terephthalic acid but in practice a polymer of p-aminophenol and 2-chloroterephthalic acid decomposes before reaching a melting point. However, as a result of the present study it is possible to give an indication of how the balance of the residues may be chosen to give polyesteramides melting below their decomposition points and exhibiting optical anisotropy in the melt.

For example, in the case of polyesteramides in which the aminophenol residues comprise at least 50 mole %, preferably at least 80 mole % and more desirably 100 mole % of p-aminophenol residues, the dicarboxylic acids may be selected from the following groups of compounds.

In a first group of compounds mono-substituted terephthalic acids having as their substituent groups alkyl and alkoxy groups each containing up to 4 carbon atoms have been found to be effective when used as the sole dicarboxylic acid in the polyesteramide or when used together with no more than 50 mole % of other linear difunctional acids, particularly terephthalic acid. It would be expected that the alkyl- or alkoxy-substituted terephthalic acids could be replaced with other aklyl- or alkoxy-substituted acids also having their chain extending bonds in coaxial or parallel and oppositely directed relationship. The alkyl- and alkoxy-substituted terephthalic acids may also be used with constituents which introduce further dissymmetry in the chain. Particularly useful is isophthalic acid. Mixtures of isophthalic acid and as little as 30 mole % of a monoalkoxy-substituted terephthalic have been found to be effective.

A second suitable constituent for use with p-aminophenol is 1,2-bis(p-carboxyphenoxy)ethane.

A third suitable constituent is 4-carboxyphenoxyacetic acid.

A further group of suitable acids are mixtures of acids comprising 20 to 50 mole % of terephthalic acid and 50 to 80 mole % of a second acid which is a dissymmetric difunctional acid, other than the alkoxy- and alkyl-substituted acids referred to above. Suitable dissymmetric acids include naphthalene-1,6-dicarboxylic acid but isophthalic acid does not appear to give sufficient disymmetry to give a melting point below the decomposition temperature even when used in a ratio of 75 mole % isophthalic acid to 25 mole % terephthalic acid.

Each of these groups of dicarboxylic acids may contain minor amounts of other dicarboxylic acids and, in particular, although it has previously been indicated that the mono-halogenated terephthalic acids are unsuitable as the sole acid for use with p-aminophenol it may be possible to include minor amounts, not exceeding 50 mole % of the total acid residues of such acids. Other acids which are unsuitable as the sole dicarboxylic acid are shown in the comparative examples. It may be possible to include minor amounts of these in polyesteramides according to the invention. It will be appreciated by those skilled in the art that the suitability of a particular acid and the concentration at which it may be used may readily be determined by simple observation of the melting characteristics of the polymer after it has been prepared in a conventional polymerisation.

When the aminophenol residues of the polyesteramide comprises at least 50 mole % and preferably at least 80 mole % and more desirably 100 mole % of residues of p-N-methylaminophenol the dicarboxylic acids are selected on somewhat different criteria than in the case of the p-aminophenol-containing polyesteramide because adjacent chains of polyesteramides containing residues of the p-N-methylaminophenol are less able to associate by hydrogen bonding thereby contributing to a reduced melting point. For example, the alkoxy derivatives suitable for use with p-aminophenol are not suitable for use with p-N-methylaminophenol.

The groups of dicarboxylic acids found suitable for producing p-N-methylaminophenol-containing polyesteramides according to the invention are as follows:

A first group of suitable acids are mixtures of acids containing at least two acids selected from the group comprising terephthalic acid, naphthalene-2,6-dicarboxylic acid and 1,2-bis(p-carboxyphenoxy)ethane. These may be used in wide proportions as further indicated in the examples and may contain, for example, as much as 75 mole % or more or as little as 25 mole % or less of terephthalic acid.

In a further group of dicarboxylic acids there may be used mixtures of acids which include at least one acid selected from the group of acids comprising terephthalic acid, naphthalene-2,6-dicarboxylic acid and 1,2-bis(p-carboxyphenoxy)ethane and at least one dicarboxylic acid which is dissymmetric by virtue of its having its chain extending bonds extending in neither coaxial or parallel and opposite directions. A preferred mixture of acids of this group is a mixture of terephthalic and isophthalic acids. It is preferred that the mixture contains not more than 30 mole % of the dissymmetric acid having non-parallel-directed chain extending bonds.

A further suitable difunctional acid is 1,2-bis(p-carboxyphenoxy)ethane which may be used as the sole acid in the polyesteramide or in admixture as described above.

As in the case of the polyesteramides based on p-aminophenol it will be found possible to include minor amounts of other acids, even those which are unsuitable when used as the sole acid.

In both the polyesteramides based on p-aminophenol and those based on p-N-methylaminophenol it is also possible to include a minor proportion of residues of one or more dihydric phenols.

In order that the polyesteramides should be readily processable into shaped articles such as fibres, film and mouldings it is necessary that they should not only exhibit anisotropy in the melt but that their softening points should not be too high. It is preferred that the softening points of the polyesteramides should be below 350° C. and desirably below 300° C. Some of the polyesteramides of the invention have softening points below 200° C. For many applications, such as for use as engineering plastics, it may be undesirable to have a polymer with too low a softening point and it is generally preferred that the softening temperature of the polymer should not be below 200° C.

The procedure used to examine the melt behaviour of the products was as follows. A sample on a glass slide was placed on a hot plate set at a temperature of about 10° C. higher than the expected softening point (previously determined very roughly). A cover slide was placed on the sample and a pressure of about 5 kg applied. A film with a thickness of 10 to 30 microns was obtained which was cooled immediately. The sample was reheated at 16° C./min whilst the edge of the film was observed between cross-polarisers. The softening temperature was taken as the temperature at which the sharp edges of film start to become rounded and on slight hand pressure the boundaries of the melt were observed to flow.

The procedures used to prepare the polymers will be well-known to those skilled in the art. A preferred method is the melt polymerisation of an acyloxy derivative of the phenol together with a chosen dicarboxylic acid in the presence of an appropriate catalyst such as magnesium powder.

The invention is further illustrated by reference to the following examples.

EXAMPLE 1

A mixture of 4[1]-acetoxyacetanilide (6.43 parts), 2-n-butoxy terephthalic acid (7.93 parts) and magnesium powder (0.0045 parts) was placed in a reaction vessel and heated at 282° C. with agitation by a flow of nitrogen. Acetic acid was rapidly evolved. The melt, initially clear, became turbid and then showed shear opalescence on stirring. After 15 minutes vacuum was slowly applied and heating was continued for 1 hour at a pressure of 0.1 mm to remove the last traces of acetic acid. The inherent viscosity of the polyesteramide was 0.92 (determined at 0.5% concentration in a 5% solution of lithium chloride in dimethylformamide at 25° C.). The polymer softened at 205° C. on a hot-stage microscope and exhibited birefringence up to at least 350° C. Fibres were obtained on melt-spinning the polymer.

EXAMPLES 2 TO 6

Using the procedure of Example 1, polyesteramides were made from equimolar amounts of the acids and 4¹-acetoxyacetanilide as shown in Table 1. All the polymers exhibited shear opalescence on stirring the melt.

TABLE 1

Polyesteramides based on 4¹-acetoxyacetanilide

| Ex. | Acids | Inherent Viscosity | Softening point | Birefringence apparent to |
|---|---|---|---|---|
| 2 | 2-methoxy terephthalic acid | 0.39 | 160–250° C. | 350° C. |
| 3 | 2-ethoxy terephthalic acid | 0.44 | 180–235° C. | 350° C. |
| 4 | 2-propoxy terephthalic acid | 0.56 | 200° C. | 350° C. |
| 5 | 75 mole % 2-propoxy terephthalic acid 25 mole % terephthalic acid | 0.64 | 260–280° C. | 350° C. |
| 6 | 75 mole % 2-propoxy terephthalic acid 25 mole % bis-p-carboxylphenoxy-ethane | 0.54 | 173–185° C. | 350° C. |

EXAMPLES 7 TO 16

Copolyesteramides based on 4¹-acetoxyacetanilide (using the acids of Table 2) were made using the procedure of Example 1.

TABLE 2

| Example | Acids | Softening Point | Anisotropy observed |
|---|---|---|---|
| 7 | 50 mole % isophthalic 50 mole % 2-methoxy terephthalic | 176–189° C. | Yes |
| 8 | 67 mole % isophthalic 33 mole % 2-methoxy terephthalic | 310–315° C. | Yes |
| 9 | 25 mole % isophthalic 75 mole % 2-propoxy terephthalic | 230° C. | Yes |
| 10 | 50 mole % naphthalene-1,6-dicarboxylic 50 mole % terephthalic | 360–370° C. | Yes |
| 11 | 25 mole % isophthalic 75 mole % 2-butoxy terephthalic | 195–200° C. | Yes |
| 12 | 12.5 mole % isophthalic 87.5 mole % 2-butoxy terephthalic | 220–240° C. | Yes |
| 13 | 50 mole % isophthalic 25 mole % terephthalic 25 mole % 2-propoxy terephthalic | 290° C. | Yes |
| 14 | 55 mole % 2-methyl terephthalic 45 mole % 4-methyl isophthalic | 228–233° C. | Yes |

TABLE 2-continued

| Example | Acids | Softening Point | Anisotropy observed |
|---|---|---|---|
| 15 | 1,2-bis(p-carboxyphenoxy) ethane | 420–425° C. | Yes |
| 16 | 4-carboxyphenoxyacetic | 320–330° C. | Yes |

COMPARATIVE EXAMPLE A

Using the procedure of Example 1, polyesteramides were made from equimolar amounts of the acids and 4¹-acetoxyacetanilide as shown in Table 3.

TABLE 3

| Run | Acids | Softening point | Anisotropy observed |
|---|---|---|---|
| 1 | Terephthalic | >380° C. | No |
| 2 | Diphenylether dicarboxylic | >435° C. | No |
| 3 | Sulphonyl dibenzoic | >435° C. | No |
| 4 | 2-chloroterephthalic | >420° C. | No |
| 5 | 2-bromoterephthalic | >440° C. | No |
| 6 | 2,5-dibromoterephthalic | >420° C. | No |
| 7 | 2-nitroterephthalic | decomposed | |
| 8 | Naphthalene-1,6-dicarboxylic | 243° C. | No |
| 9 | Isophthalic | 390° C. | No |
| 10 | 2,2¹-diphenic | 190–195° C. | No |
| 11 | 50 mole % terephthalic 50 mole % isophthalic | >435° C. | No |
| 12 | 25 mole % terephthalic 75 mole % isophthalic | >435° C. | No |
| 13 | 50 mole % 2,2¹-diphenic 50 mole % terephthalic 50 mole % isophthalic | 310–320° C. | No |
| 14 | 50 mole % naphthalene-2,6-dicarboxylic 25 mole % isophthalic | 410–420° C. | No |
| 15 | 75 mole % diphenylether dicarboxylic | >390° C. | No |
| 16 | 25 mole % isophthalic 75 mole % 2-chloroterephthalic 85 mole % isophthalic | >370° C. | No |
| 17 | 15 mole % s-propoxy-terephthalic | 375–380° C. | No |

EXAMPLES 17 TO 22

Polyesteramides based on 4¹-acetoxy-N-methylacetanilide were prepared by reacting 4¹-acetoxy-N-methylacetanilide with an equimolecular amount of acid (as detailed in Table 4) and a catalytic amount of magnesium powder as described in Example 1.

TABLE 4

| Ex. | Acids | Softening point | Anisotropy obsrved (?) |
|---|---|---|---|
| 17 | 50 mole % terephthalic 50 mole % naphthalene-2,6-dicarboxylic | 295° C. | Birefringement to >350° C. |
| 18 | 25 mole % terephthalic 75 mole % 1,2-bis(p-carboxyphenoxy)ethane | 280–290° C. | Birefringement to 320° C. |
| 19 | 40 mole % terephthalic 60 mole % 1,2-bis(p-carboxyphenoxylenethane | 270–280° C. | Birefringement to 308° C. |
| 20 | 75 mole % terephthalic 25 mole % isophthalic | 190° C. | Yes |
| 21 | 85 mole % terephthalic 15 mole % isophthalic | 200° C. | Yes |
| 22 | 1,2-bis(p-carboxyphenoxy) ethane | 270–280° C. | Yes |

COMPARATIVE EXAMPLE B

Polyesteramides based on 4¹-acetoxy-N-methylacetanilide were prepared according to the procedure of Examples 17 to 22 using the acids of Table 5.

TABLE 5

| Run | Acid | Softening point | Anisotropy observed |
|---|---|---|---|
| 18 | Terephthalic | 435–440° C. | No |
| 19 | Naphthalene-2,6-dicarboxylic | >360° C. | No |
| 20 | 2-chloroterephthalic | 230–240° C. | No |
| 21 | 2-methoxyterephthalic | 195–205° C. | No |

We claim:

1. Fibre-forming polyesteramides capable of forming an optically anisotropic melt and having a melting point below the decomposition temperature of the polyesteramide consisting essentially of residues of aminophenols wherein at least 50% of the residues are selected from p-aminophenol and p-N-methylaminophenol and residues of aromatic dicarboxylic acids which contain one or more aromatic rings that form part of the main chain of the polyesteramide and are selected from residues of the group consisting of:
   (a) acids with aromatic rings containing one or more unreactive monovalent constituents and which are connected to other residues in the main chain by coaxial or parallel and oppositely directed bonds,
   (b) acids with aromatic rings connected to other residues in the main chain by two valency bonds which are neither coaxial nor parallel and oppositely directed,
   (c) acids with aromatic rings which are one or more p-phenylene groups connected to other residues in the main chain through two valency bonds to two chemically different atoms,
   (d) acids with unsubstituted aromatic rings which are connected to other residues in the main chain by coaxial or parallel and oppositely directed bonds,
   (e) mixtures of at least two of the types of residues (a), (b), (c) and (d).

2. Melt processable fibre-forming polyesteramides according to claim 1 wherein the aminophenol residues comprise at least 50 mole % of residues of p-aminophenol and the residues of the dicarboxylic acids include residues of acids selected from:
   (a) one or more mono-substituted terephthalic acids wherein the substituent groups consist of alkyl and alkoxy each containing up to 4 carbon atoms,
   (b) 1,2-bis(p-carboxyphenoxy)ethane,
   (c) 4-carboxyphenoxyacetic acid, and
   (d) mixtures of at least two aromatic dicarboxylic acids comprising from 20 to 50 mole % of terephthalic acid and 50 to 80 mole % of a dissymmetric difunctional acid.

3. Melt processable fibre-forming polyesteramides according to claim 2 wherein the difunctional acid comprises a mixture containing at least 30 mole % of an alkyl- or alkoxy-substituted terephthalic acid.

4. Melt processable fibre-forming polyesteramides according to claim 2 wherein the mixture of at least two aromatic carboxylic acids comprises a mixture of terephthalic acid and naphthalene-1,6-dicarboxylic acid.

5. Melt processable fibre-forming polyesteramides according to claim 1 wherein the aminophenol residues comprise at least 50 mole % of residues of p-N-methylaminophenol and the residues of dicarboxylic acids are selected from:
   (a) a mixture of at least two acids selected from terephthalic acid, naphthalene-2,6-dicarboxylic acid and 1,2-bis(p-carboxyphenoxy)ethane,
   (b) 1,2-bis(p-carboxyphenoxy)ethane,
   (c) a mixture of dicarboxylic acids wherein at least one of the acids is selected from terephthalic acid, naphthalene-2,6-dicarboxylic acid and 1,2-bis(p-carboxyphenoxy)ethane and at least one acid is a dissymmetric difunctional acid having its chain extending bonds extending in neither coaxial nor parallel and opposite directions.

6. Melt processable fibre-forming polyesteramides according to claim 5 wherein the mixture of acids of type (a) contains from 20 to 80 mole % of terephthalic acid.

7. Melt processable fibre-forming polyesteramides according to claim 5 wherein the mixture of acids of type (c) contains not more than 30 mole % of the dissymmetric acid.

8. Melt processable fibre-forming polyesteramides according to claim 7 wherein the mixture of acids of type (c) is a mixture of terephthalic and isophthalic acids.

9. Melt processable fibre-forming polyesteramides according to claim 1 having a softening point of less than 350° C.

10. Melt processable fibre-forming polyesteramides according to claim 9 having a softening point of less than 300° C.

11. An anisotropic melt of a polyesteramide according to claim 1.

12. Shaped articles formed from an anisotropic melt according to claim 11.

* * * * *